United States Patent [19]

Martin

[11] 4,126,210

[45] Nov. 21, 1978

[54] ELEVATOR CAR WITH ADJUSTABLE ILLUMINATION LEVEL AND DISTRIBUTION PATTERNS

[75] Inventor: Niles J. Martin, Bonneauville, Pa.

[73] Assignee: Westinghouse Electric Corp., Pittsburgh, Pa.

[21] Appl. No.: 819,327

[22] Filed: Jul. 27, 1977

Related U.S. Application Data

[63] Continuation of Ser. No. 705,184, Jul. 14, 1976, abandoned.

[51] Int. Cl.[2] ........................ B66B 11/00; B60Q 3/00; F21V 21/02

[52] U.S. Cl. ........................................ 187/1 R; 362/76

[58] Field of Search ............ 187/1 R; 240/2 R, 7.1 R, 240/9 R, 51.11 R

[56] References Cited

U.S. PATENT DOCUMENTS

| | | | |
|---|---|---|---|
| 2,680,502 | 6/1954 | Kurtzon | 240/51.11 R |
| 3,035,165 | 5/1962 | Trott | 240/51.11 R |
| 3,328,576 | 6/1967 | Jacobs | 240/9 R |
| 3,631,942 | 1/1972 | Brounn | 187/1 R |

*Primary Examiner*—Evon C. Blunk
*Assistant Examiner*—Jeffrey V. Nase
*Attorney, Agent, or Firm*—D. R. Lackey

[57] ABSTRACT

An elevator car including a passenger compartment having a selectable light distribution pattern through horizontally adjustable lighting fixtures and a vertically adjustable suspended ceiling which includes a light diffusing shield.

1 Claim, 1 Drawing Figure

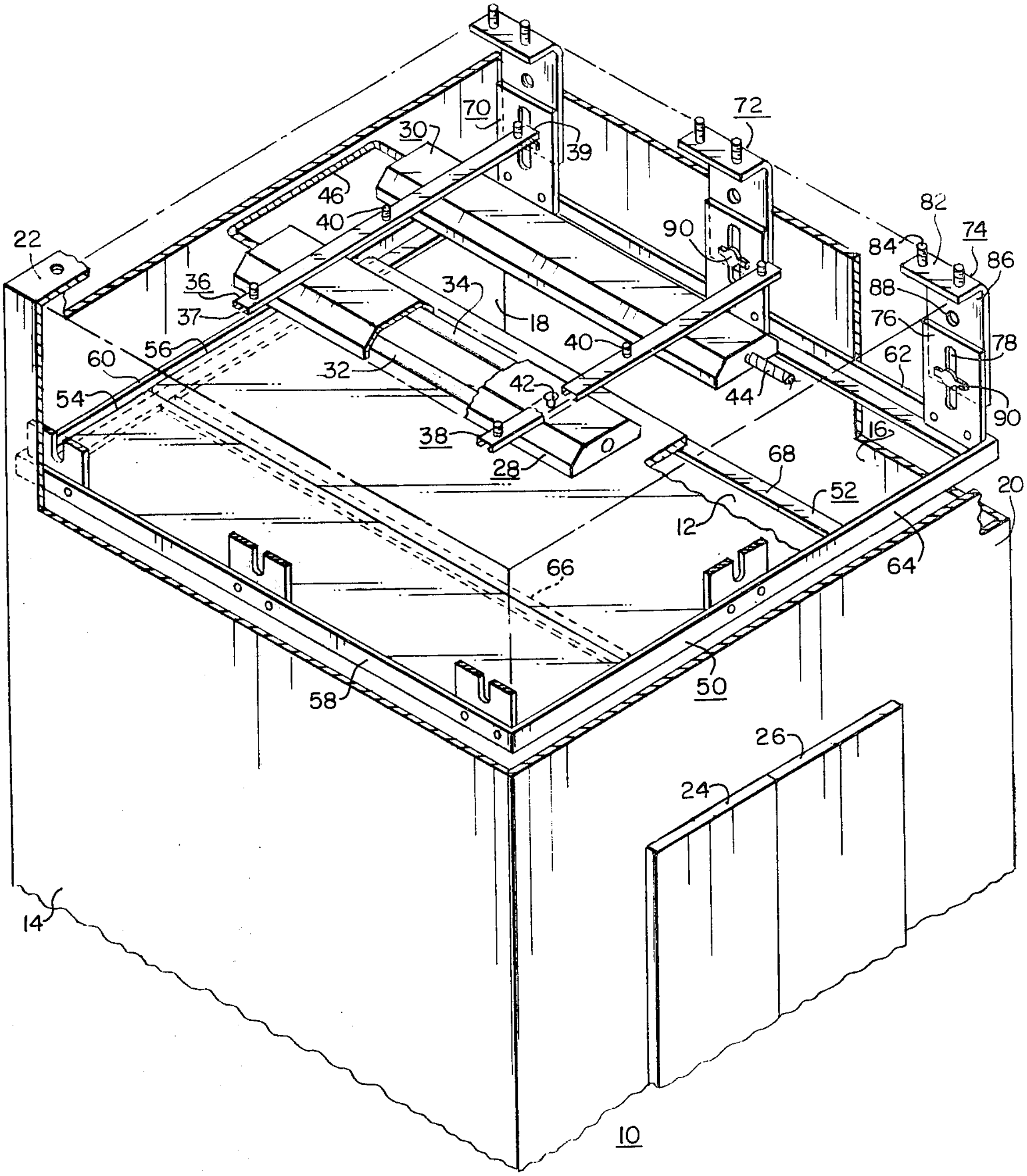
72
70
30
39
46
40
90
82
84
74
86
22
36
34
88
76
37
18
40
78
56
60
62
32
42
44
90
54
38
28
16
68
52
20
12
64
66
50
58
26
24
14
10

ELEVATOR CAR WITH ADJUSTABLE ILLUMINATION LEVEL AND DISTRIBUTION PATTERNS

This is a continuation of application Ser. No. 705,184 filed July 14, 1976 now abandoned.

BACKGROUND OF THE INVENTION

1. Field of the Invention

The invention relates in general to elevator cars, and more specifically to the construction and illumination of the passenger compartment thereof.

2. Description of the Prior Art

Prior art elevator cars which have a suspended ceiling in the passenger compartment utilize lighting fixtures which are fixedly mounted to the car ceiling, and the suspended ceiling is fixedly mounted a predetermined distance from the car roof portion.

If for some reason it is desired to increase or decrease the illumination level in the passenger compartment, or to change the light distribution pattern which appears on the light diffusing shield portion of the suspended ceiling, or to change the light distribution pattern within the passenger compartment, or any combination of these changes, the dropped ceiling must be removed and the mounting brackets modified or replaced. If lighting fixtures are added or removed, all of the fixtures must be removed in order to properly horizontally space the new arrangement of fixtures. If the newly selected positions for the lighting fixtures and/or the newly selected spacing for the suspended ceiling, it is not properly pre-evaluated to achieve the desired results, the entire procedure must be repeated. A less than optimum illumination level and/or light distribution pattern is often accepted because of the time and cost of changing either or both.

SUMMARY OF THE INVENTION

Briefly, the present invention is a new and improved elevator car having a passenger compartment constructed to enable the illumination level and/or light distribution pattern, to be quickly changed without modification to the mounting brackets of either the lighting fixtures or suspended ceiling.

Lighting fixtures are slidably mounted on track members which are fixed to the roof portion of the passenger compartment, in the space between the roof portion and the suspended ceiling. The suspended ceiling includes a light diffusing shield usually formed of a plurality of removable translucent panel members, and adjustable bracket members. The adjustable bracket members are accessible through the framework which supports the suspended ceiling when the translucent panels are displaced or removed, enabling the distance between the roof portion and the suspended ceiling to be adjustably selected. This arrangement enables both horizontal adjustment of the lighting fixtures and vertical adjustment of the light diffusing shield to cooperatively provide the desired illumination pattern of the lighting fixtures on the diffusing shield, the desired illumination level within the passenger compartment, as well as the light distribution within the passenger compartment.

BRIEF DESCRIPTION OF THE DRAWING

The invention may be better understood, and further advantages and uses thereof more readily apparent, when considered in view of the following detail description of exemplary embodiments, taken with the accompanying drawing in which the single FIGURE is a fragmentary, perspective view, shown partially in phantom, of an elevator car constructed according to the teachings of the invention.

DESCRIPTION OF PREFERRED EMBODIMENT

Referring now to the single FIGURE, there is shown an elevator car 10 constructed according to the teachings of the invention. Only those portions of an elevator car pertinent to the invention are illustrated, in order to simplify the drawing. Further, selected portions of the elevator car 10 are illustrated in phantom in order to more clearly illustrate the invention.

The elevator car 10 includes a passenger compartment 12 defined by a floor (not shown), four side wall portions 14, 16, 18 and 20, and a roof portion 22. One of the side wall portions, such as side wall portion 20, has a passenger opening therein through which access is enabled or prevented by slidably mounted doors 24 and 26 operably linked with a suitable door operator (not shown).

Illumination for the passenger compartment is provided with at least one lighting fixture. For purposes of example, two lighting fixtures 28 and 30 are shown in the drawing, but any desired number may be used depending upon the size of the passenger compartment 12 and the desired illumination level therein. The lighting fixtures are preferably of the fluorescent type, each having one or more fluorescent lamps, such as fluorescent lamps 32 and 34 shown in lighting fixture 28.

The lighting fixtures 28 and 30 are adjustably mounted to the roof portion 22 via elongated track means, which in a preferred embodiment includes first and second spaced, parallel track members 36 and 38. Each track member has first and second ends, such as first and second ends 37 and 39 of track member 36, and each have a substantially C-shaped cross-sectional configuration. The opening of the C-shaped cross-sectional configuration faces downwardly, and the back portion thereof is fixed to the roof portion 22 with suitable hardware 40. At least the first ends 39 of the track members 36 and 38 are spaced from the adjacent side wall portion 16 by a distance selected to enable the lighting fixtures 28 and 30 to be engaged with and slidably mounted on the track members 36 and 38, after the track members are fixed to the roof portion 22.

The lighting fixtures 28 and 30 each have two mounting members fixed to the top surface thereof, one for each track member, with the spacing being selected according to the spacing of the track members. A single mounting member 42 on lighting fixture 28 is illustrated, since all of the mounting members are of similar construction. Each of the mounting members 42 having a substantially T-shaped cross-sectional configuration dimensioned to enter the C-shaped opening in a track member and to allow the lighting fixture to be slidably positioned along the track members, to the desired position. The lighting fixtures are adjusted to achieve the desired light distribution pattern in the passenger compartment. Crimping clips in the slide tracks may be used to lock the selected position of each lighting fixture.

Electrical power from a car top supply is introduced into the elevator car via an opening in the roof portion 22, and a flexible electrical conductor 44 extends from this opening to the lighting fixture 30. Flexible conductor 44 is of sufficient length to enable the lighting fixture 30 to be located anywhere within its adjustment range. A flexible conductor 46 electrically connects lighting fixture 28 to lighting fixture 30. Conductor 46 is of sufficient length to accommodate the maximum practical spacing between the two lighting fixtures. If an additional lighting fixture is desired, it would simply be placed into position on the tracks and electrically connected to the adjacent lighting fixture via a flexible conductor.

The adjustable lighting fixtures simplify installation and permit adjustment of the light distribution pattern at the factory, and they enable the illumination level within the passenger compartment to be increased or decreased in the field, if required. They also permit the user to change the light distribution pattern across the passenger compartment if the originally selected distribution pattern is not suitable.

Changing the illumination level by adding or removing light fixtures, however, is no sufficient in itself to provide the proper light diffusion pattern. The light from the lighting fixtures is diffused by a light diffusing shield mounted below the light fixtures in a hung or suspended ceiling which then forms the ceiling of the passenger compartment. There is a definite relationship between the illumination level provided by the lighting fixtures, and the proper distance between the lighting fixtures and the light diffusing shield of the suspended ceiling. The higher the illumination level, the greater the distance, for proper light diffusion, required between the lighting fixtures and the light diffusing shield. In other words, it is undesirable to be able to see a sharp outline of the fluorescent lamps when viewing the light diffusing shield, and the suspended ceiling should be moved downwardly until the light diffusing shield appears substantially evenly lighted from above. When this spacing is achieved, the light diffusing shield will provide a more uniform light distribution within the passenger compartment, and it will also provide a more pleasing appearance.

The present invention enables the optimum diffusion and light distribution pattern to be quickly achieved at the factory, and just as easily changed in the field to accommodate the user's requirements, if they differ from those originally selected. The invention also permits lighting fixtures to be removed, or added, as desired to change the illumination level, and to then adjust the spacing between the lighting fixtures and the light diffusing shield to provide the optimum diffusion pattern for the newly selected illumination level.

More specifically, the elevator car 10 includes a hung or suspended ceiling 50 which includes a frame assembly 52 constructed to support the light diffusing shield. The light diffusing shield is usually formed of a plurality of translucent panel members which cooperatively function as the light diffusing shield. In the drawing, the suspended ceiling 50 utilizes three translucent panel members, two of which, referenced 54 and 56, are shown in position on the frame assembly 52.

The frame assembly 52 includes four right angle members 58, 60, 62 and 64 dimensioned and suitably joined together to provide the square or rectangular configuration necessary to function as a ceiling in the specific elevator car it is to be associated with. With three translucent panel members, the frame assembly 52 would additionally have two cross members 66 and 68 disposed in parallel spaced relation between angled members 60 and 64. Members 66 and 68 may be thin flat members having a rectangular cross-sectional configuration, or they may have an inverted T-shaped cross-sectional configuration, as desired. Members 66 and 68 are spaced to accommodate the width dimensions of the associated translucent panel members.

The mounting means for suspending the frame assembly 50 from the roof portion 22 includes a plurality of spaced, adjustable bracket assemblies, such as bracket assemblies 70, 72 and 74. The remaining bracket assemblies are shown cut away in order to simplify the drawing.

Since each of the bracket assemblies are functionally similar, only bracket assembly 74 will be described in detail. Bracket assembly 74 is a three piece assembly, which includes a flat, elongated rectangularly shaped member 76, one end of which is fixed to the angle member 62. A slot 78 is provided in member 76 which extends between its major opposed flat surfaces, with the slot being vertically oriented after member 76 is fixed to the angle member 62.

The second part of bracket assembly 74 includes an L-shaped member 80 having first and second leg portions 82 and 86, with the first leg portion 82 being disposed against the roof portion 22 and secured thereto with suitable hardware 84. The second leg portion 86 is oriented downwardly from the roof portion 22 along side wall portion 16 of the elevator car 10. The second leg portion 86 includes a plurality of vertically spaced, tapped openings therein, such as tapped opening 88.

The third part of the bracket assembly 74 is a wing bolt 90. The wing bolt 90 interconnects the first two parts of the bracket assembly.

The construction of the suspended ceiling merely requires that the second parts of the bracket assemblies be fixed to the roof portion 22, and the frame assembly 50 is constructed with the first parts of the bracket members fixed thereto. The frame assembly 50 is then placed within the passenger compartment and elevated to a position which is close to the desired spacing from the lighting fixtures. The wing bolts 90 are placed through slot 78 into the tapped opening 88 which will allow the greatest adjustment range for the spacing of the frame assembly 50 from the lighting fixtures. The wing bolts 90 may then be turned until the frame assembly 50 is secured in this rough position, but not tight enough to prevent a sliding, vertical adjustment of the frame assembly 50 when pressure is vertically applied to the frame assembly. The frame assembly 50 may then be adjusted to the exact desired spacing via the vernier adjustment provided by the vertically oriented elongated slots 78, and the wing bolts may then be securely tightened to maintain the selected position of the ceiling. The plurality of translucent panel members may then be placed into position on the frame assembly.

In summary, the lateral positioning of the lighting fixtures may be adjusted, and/or lighting fixtures may be added or removed, and/or the spacing of the light diffusing shield from the lighting fixtures may be increased or decreased, merely by lifting and displacing or removing the necessary panel member, or members, to gain access to the adjustable lighting fixtures and the adjustable mounting brackets, as desired, according to the specific change in light distribution, illumination level, or light diffusion pattern required. In addition to permitting variable adjustment of the ceiling height to correct the illumination pattern of the fluorescent lamps on the light diffusing shield, permitting lateral adjustment of the lighting fixtures to obtain optimum light distribution, and to facilitate the adding or removal of lighting fixtures for changing illumination level, the invention also eliminates the need for manufacturing a plurality of different brackets for accommodating different car and transom heights.

I claim as my invention:

1. An elevator car, comprising:

a passenger compartment having roof and side wall portions, elongated track means having a first predetermined cross-sectional configuration fixed to said roof portion within said passenger compartment, said elongated track means having a length dimension sufficient to receive and support more than one lighting fixture, at least two lighting fixtures slidably mounted on said elongated means, said lighting fixtures including mounting members having a second predetermined cross-sectional configuration, said first and second predetermined cross-sectional configurations being cooperatively configured to provide support and enable adjustable positioning of said lighting fixtures, with one being substantially C-shaped, and the other substantially T-shaped.

flexible electrical conductor means connected to said lighting fixtures, said flexible electrical conductor means having lengths selected to enable the initial positions of said lighting fixtures to be adjustably selected, and for enabling their positions to be subsequently changed within a predetermined adjustment range, said elongated track means permitting lighting fixtures to be added and removed therefrom to achieve a desired illumination level in said passenger compartment, as well as providing horizontal adjustment of a lighting fixture relative to certain of the sidewall portions and relative to any other lighting fixtures which may be mounted on said elongated track means.

a frame assembly including removable light diffusing shield means, and adjustable mounting means, said adjustable mounting means mounting said frame assembly below said roof portion within said passenger compartment, in vertically spaced relation relative to said lighting fixtures, to provide a vertically adjustable dropped ceiling in said passenger compartment, said adjustable mounting means including a plurality of bracket assemblies accessible from within said passenger compartment through said frame assembly by displacement of said removable light diffusing shield means, each of said bracket assemblies including first and second members fixed to said roof portion, and to said frame assembly, respectively, with one of said first and second members including a vertically oriented slot, and fastener means linking said first and second members via said slot, said bracket assemblies permitting adjustable selection of the initial vertical distance between said lighting fixtures and said frame assembly, and enabling said distance to be subsequently changed, permitting the light distribution pattern within the passenger compartment, and the illumination pattern on the light diffusing shield means, to be adjustably selected.

* * * * *